(12) United States Patent
Kalish et al.

(10) Patent No.: US 10,523,970 B2
(45) Date of Patent: Dec. 31, 2019

(54) KEYFRAME-BASED VIDEO CODEC DESIGNED FOR GPU DECODING

(71) Applicant: IDOMOO LTD, Hod Hasharon (IL)

(72) Inventors: Danny Kalish, Raanana (IL); Aviya Cherevatsky, Atlit (IL)

(73) Assignee: IDOMOO LTD, Hod Hasharon (IL)

( * ) Notice: Subject to any disclaimer, the term of this patent is extended or adjusted under 35 U.S.C. 154(b) by 32 days.

(21) Appl. No.: 15/868,285

(22) Filed: Jan. 11, 2018

(65) Prior Publication Data

US 2018/0199067 A1 Jul. 12, 2018

Related U.S. Application Data

(60) Provisional application No. 62/444,873, filed on Jan. 11, 2017.

(51) Int. Cl.
*H04N 19/176* (2014.01)
*H04N 19/625* (2014.01)

(52) U.S. Cl.
CPC ......... *H04N 19/625* (2014.11); *H04N 19/176* (2014.11)

(58) Field of Classification Search
CPC .......................... H04N 19/124; H04N 19/176
USPC ....................................... 375/240.02–240.29
See application file for complete search history.

(56) References Cited

U.S. PATENT DOCUMENTS

2018/0309991 A1* 10/2018 Thiagarajan ......... H04N 19/124

\* cited by examiner

*Primary Examiner* — Anand S Rao
(74) *Attorney, Agent, or Firm* — Browdy and Neimark, P.L.L.C.

(57) ABSTRACT

The present invention discloses a method and system for encoding and decoding a keyframe based video by a GPU (Graphic Processing Unit) in a manner that a frame of bit stream data is read directly by the GPU and a CPU only reads the frame from disk and activates the GPU to decod the data read from the disk. The codec effectively exploits modern GPU architecture during video keyframe decoding and minimizes the number of required GPU memory access cycles during video keyframe decoding.

21 Claims, 15 Drawing Sheets

The encoder algorithm flow

Decoder algorithm flow. (dashed frames indicate optional steps depending on a super macroblock type)

Fig. 5A

| Type Name | length | Description |
|---|---|---|
| offset_t | 3 bytes | unsigned integer, indicates a bit position in the bitstream |
| bit_t | 1 bit | this is the most basic type. |
| bitStream_t | [NA] | a sequence of bit_t |

Table 1 - Basic Data Types

Fig. 5B

| Type Name | Type | Description |
|---|---|---|
| coefficient_t | bitStream_t | huffman code bits sequence representing a single dct coefficient. |
| coefficients_t | bitStream_t | sequence of coefficient_t. |
| null_t | bitStream_t | used for marking the end of non fixed size data. |

Table 2 - Macro Block Data Type

Fig. 5C

| Field Name | Type |
|---|---|
| Y dct coefficients | coefficients_t |
| Null terminate | null_t |
| A dct coefficients | coefficients_t |
| Null terminate | null_t |
| U coefficients_t | coefficients_t |
| Null terminate | null_t |
| V coefficients_t | coefficients_t |
| Null terminate | null_t |

Table 3 - FC (full color) Macro Block layout

Fig. 5D

| Field Name | Type |
|---|---|
| Y dct coefficients | coefficients_t |
| Null terminate | null_t |
| A dct coefficients | coefficients_t |
| Null terminate | null_t |

Table 4 - HC (Half Color) Macro Block layout

Fig. 5E

| FC | HC | HC | ... | FC | HC | HC | HC | FC | HC |
|----|----|----|-----|----|----|----|----|----|----|
| HC | HC | HC | ... | HC | HC | HC | HC | HC | HC |
| FC | HC | FC | ... | FC | FC | FC | FC | FC | HC |
| HC | HC | HC | ... | HC | HC | HC | HC | HC | HC |
| ... | ... | ... | ... | ... | ... | ... | ... | ... | ... |
| FC | HC | FC | ... | HC | FC | HC | FC | FC | HC |
| HC | HC | HC | ... | HC | HC | HC | HC | HC | HC |

Table 5 – Bit stream lay out. with focus of MB types order. FC MB types holds uv information are one quarter of the data. exactly like its ratio on the input format (YUV 420).

Bitstream layout together with entry table. Each entry holds the position of the relevant SMB on the bitstream data.

Entry table dynamic update during decoding session. the new offset is written to the entry table on every decoding session, the output of the previous session in the input to the current session.

Parallelism can be achieved while decoding macroblock and between decoding sessions. the dark blocks represents the bitstream parsing while the light color blocks represent the de-quantization and IDCT transform.

Fig. 9B

| 0 | 1 | 2 | 3 | 4 | 5 | 6 | 7 | 8 |
|---|---|---|---|---|---|---|---|---|
| 0,8 | 0,7 | 0,4 | 1,45 | 0,6 | 1,12 | 1,25 | 1,53 | 1,0 |

Serialized Huffman binary tree presentation 5200

KEYFRAME-BASED VIDEO CODEC DESIGNED FOR GPU DECODING

FIELD OF THE INVENTION

The presented invention is related to the field of image and video compression, and specifically to decoding videos and images with a graphics processing unit.

BACKGROUND

Codecs for compressing frames of video may use a graphics processing unit (GPU) to accelerate the task. Most codecs perform the compression task by generating a bit stream consisting of several image macro-blocks, where each macro-block may be encoded with a different number of bits. Typically, in order to decode a given macro-block, the decoder must first process its predecessor (with exception of cases where macro-blocks are located on separate streams). For parallel decoding, this constraint raises a problem since ideally, a large number of macro-blocks should be processed in parallel.

For most known codecs that support YUV420 input pixel format, the luma and the chroma channels (or "planes") are divided into squares of pixels that are subsequently transformed into the 2D frequency domain. Typically, the square pixels group differ in size depending on the channel type. For instance, where the Y plane is divided into 8×8 samples, the U and V planes would be divided into 4×4 samples.

SUMMARY

The present invention discloses a method for encoding a bit stream in a way that can be processed by a GPU such that no extra steps need to be calculated by a CPU except launching the decoding process on the GPU. The method includes adding an entry table that points to a position in the bit stream from which a GPU thread should decode. During the decoding process, each GPU thread reads one entry from the entry table. The current method introduces a file structure that maintains constant pixel group size across all input planes.

The present invention further discloses a novel file format, an algorithm for encoding raw images into the format, and an algorithm for decoding the format back into the original image. The format is designed for fast parallel decoding and may be implemented on a platform with an inexpensive multiprocessor such as a GPU. The format layout has been designed to effectively exploit modern GPU architecture during decoding in order to achieve extremely high performance while maintaining high output image quality.

These and other features and advantages of the invention will be more fully understood from the following detailed description of the invention taken together with the accompanying drawings.

The present invention provides a method for encoding bit stream image data organized into sub blocks, said method implemented by one or more processors operatively coupled to a non-transitory computer readable storage device, on which are stored modules of instruction code that when executed cause the one or more processors to perform:

transforming each sub block into a frequency domain DCT matrix;

coding coefficients of the DCT matrix by a Huffman tree algorithm which is represented by an array that holds two fields, the first for data, the second an indication of whether a node is an end-leaf, wherein the data field represents the actual leaf value on a leaf node, and an offset to a child node with the smaller probability on an inner node, and wherein the array entries are ordered such that a child node with the larger probability is located adjacent to the parent node, and the child node with the smaller probability is pointed by the parent node on the data field.

According to some embodiments the present invention, the sub blocks are defined by dividing plane segment of raw data into grid of N*N samples for each plane.

According to some embodiments the present invention the sub blocks are organized by grouping and compressing N×N adjacent samples into a sub-blocks structure where all sub-blocks are compressed to the same size of data regardless channel type;

According to some embodiments the present invention the method further comprising the step of defining macro-block which comprises fixed number sub-blocks.

According to some embodiments the present invention the macro-blocks are organized by super macro-block by setting the corresponding entry on the entry table to the current bit stream offset of each super macro-block and encoding each macro-block in the super macro-block structure.

According to some embodiments the present invention the method further comprising further steps for decoding comprising:

copying an entry table, Huffman trees, and bit stream data into the GPU memory space and activating parallel computing;

launching a multiprocessing thread by the decoder on at least one super macro-block;

reading an entry from the entry table and retrieving the bit stream data, and, for each sub-block, parse the bit stream with the respective given Huffman tree until reaching a null terminate value; write the new bit stream position to the entry table; re-quantize the DCT coefficient; and transform the DCT back to a spatial domain with the IDCT transform.

According to some embodiments the present invention the multiple decoding iteration is partially performed in parallel by launching the next decoding iteration immediately after writing a new bit stream position to entry number N in the entry table for the last plane.

According to some embodiments the present invention the encoding the said Huffman tree comprises performing a pre-order traversal, where the first child node to iterate is the child node with the higher probability.

According to some embodiments the present invention the said bit stream size is optimized by storing identical super macro-block once and using the entry table to points to the same data from different entries.

According to some embodiments the present invention the said bit stream size is optimized in case number of sequential identical macro-blocks are positioned on the same super macro-block, where the optimization is achieved by the following steps:

The encoder writes the data of the first macro-block only;

The encoder replace the following identical macro-block completely with only one null terminate value.

The present invention provides an encoder implemented on at least one processing unit for encoding stream image data organized in sub blocks said system comprising a non-transitory storage device and one or more processing devices operatively coupled to the storage device on which are stored modules of instruction code executable by the one or more processors, wherein at one process implement comprising the following step;

transforming each sub block data into frequency domain DCT matrix;
coding coefficients of the DCT matrix by a Huffman tree algorithm which is represented by
i. An array that holds two fields:
ii. data
iii. indication whether a node is an end-leaf.
b. The data field represents the actual leaf value on a leaf node, and offset to the child with less probability on an inner node.
c. The array entries are ordered in the following manner
a child node with the greatest probability is located adjacent to the parent node.
A child node with smaller probability being pointed by the parent node on the data field.

According to some embodiments the present invention the sub blocks are defined by dividing each segment of raw data into a grid of N*N samples for each plane.

According to some embodiments the present invention the sub blocks are organized by Grouping and compressing N×N adjacent grid samples into sub-blocks structure where all sub-blocks compresses the same size of data regardless channel type having the same size for each plane;

According to some embodiments the present invention the method further comprising the step of defining macro-block which comprises fixed number sub-blocks.

According to some embodiments the present invention macro-blocks are organized by super macro-block by setting the corresponding entry on the entry table to the current bit stream offset of each super macro-block and encode each macro-block in the super macro-block structure.

According to some embodiments the present invention the encoder further comprising multi processing units and a decoder applying the following steps:
a. copy entries table, Huffman trees and bit stream into the GPU memory space and activating parallel computing,—
b. launching multiprocessing thread launched by the decoder on at least one super macro-block.
c. read entry from entry table and retrieve bit stream data and for each sub block perform:
d. parse the bit stream with the respective given Huffman tree until reaching a null terminate value;
e. write the new bit stream position on the entry table;
f. De-quantize the DCT coefficient;
g. Transform the DCT back to spatial time domain with the IDCT transform.

According to some embodiments the present invention the multiple decoding iteration is partially performed in parallel by launching the next decoding iteration immediately after writing the new bit stream position on entry number N in the entry table for the last plane.

According to some embodiments the present invention for encoding the said Huffman tree are performed a pre order like traversal, where the first child to iterate on, is the child with the higher probability.

According to some embodiments the present invention the said bit stream size is optimized by storing identical super macro-block once and using the entry table to points to the same data from different entries.

According to some embodiments the present invention the said bit stream size is optimized in case number of sequential identical macro-blocks are positioned on the same super macro-block, where the optimization is achieved by the following steps:
the encoder writes the data of the first macro-block only;
the encoder replaces the following identical macro-block completely with only one null terminate value.

BRIEF DESCRIPTION OF THE DRAWINGS

FIGS. 5A-5E present tables of data formats, where table 1 presents basic data types, table 2 presents macro-block data types, table 3 presents an FC macro-block, table 4 presents an HC macro-block layout, and table 5 presents a bit stream layout with a focus on macro-block types, according to some embodiments of the current invention

FIGS. 9A and 9B illustrate serialized Huffman binary tree presentation according to one embodiment of the current invention.

DETAILED DESCRIPTION OF THE INVENTION

Figure 1:
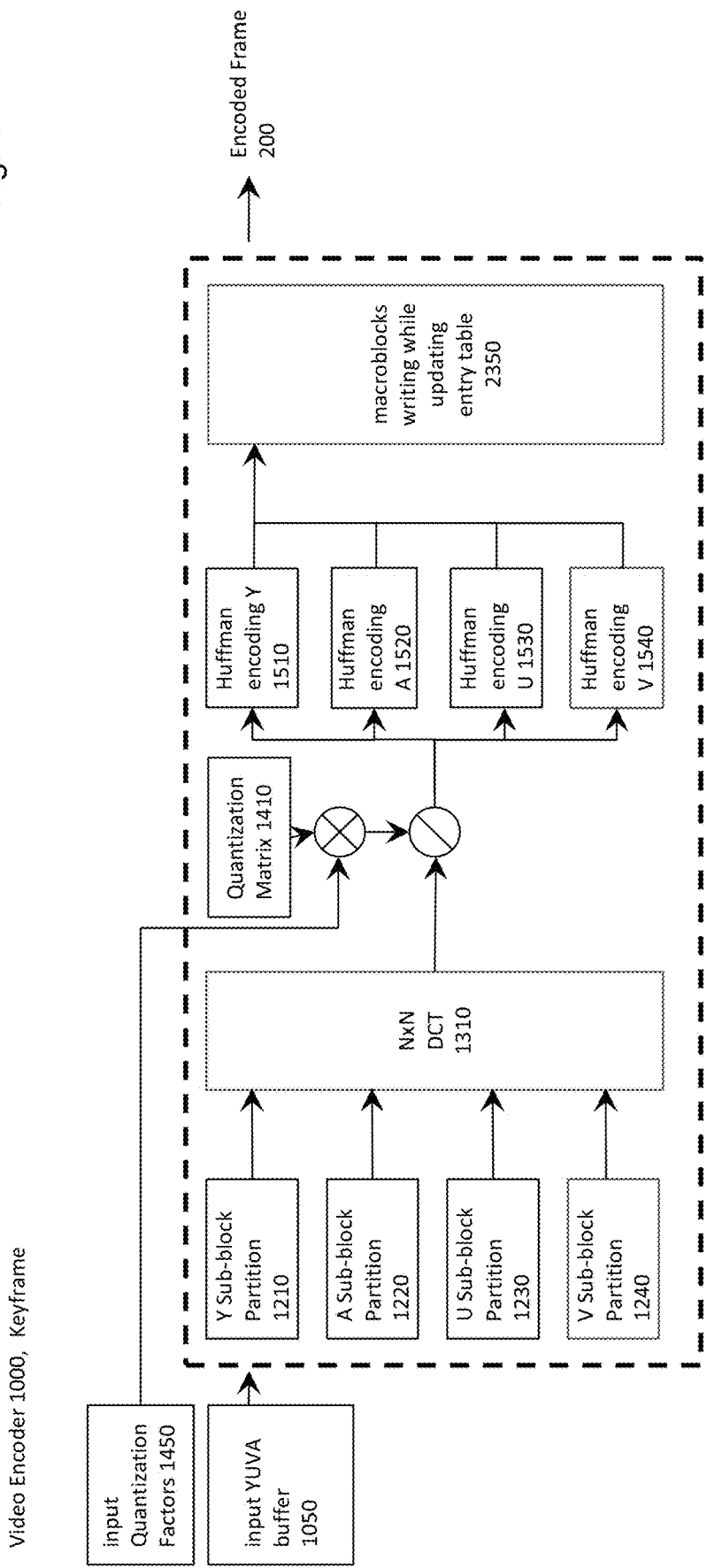
FIG. 1 presents a block diagram depicting the stages of video keyframe encoding, according to an embodiment of the current invention.

In the following detailed description of various embodiments, reference is made to the accompanying drawings that form a part thereof, and in which are shown by way of illustrating specific embodiments by which the invention may be practiced. It is understood that other embodiments may be envisioned and structural changes made without departing from the scope of the present invention. The following definitions are to be understood in the subsequent discussion:

| | |
|---|---|
| Keyframe (intra-frame) | An image frame that is normally timed at predefined intervals of a video sequence or at changes of a video scene. Keyframe content is completely stored in a video data bit stream, as opposed to inter-frames, which are normally expressed in terms of difference from preceding frames. |
| Video components and video channels | The present invention relates to image data comprising 4 components:<br>Y - Luminance (brightness) video component<br>U, V - Chrominance (color) video components<br>A - Opacity video component |
| DCT | Discrete Cosine Transform |
| IDCT | Inverse Discrete Cosine Transform |
| Sub-block | A block of 4×4 elements comprising a portion of a keyframe, and related to a specific video component (Y, U, V or A).<br>In the context of a decoded video or original video keyframe, the elements of a sub-block are the actual frame's video components, i.e.: the levels of Y, U, V or A of each pixel in a 4×4 matrix of samples.<br>In the context of an encoded frame, the 4×4 sub-block elements are Entropy-encoded, quantized, DCT coefficients, pertaining to a specific video component (Y, U, V or A). |

-continued

| | |
|---|---|
| FC (Full color) macro-block | A block of data comprised of sub-blocks pertaining to all 4 video channels (Y, U, V and A) |
| HC (Half color) macro-block | A block of data comprised of sub-blocks pertaining to the Luma (Y) and Opacity (A) channels |

The current invention presents a unique method for encoding video keyframes, in a manner suitable for fast, GPU decoding. Said video keyframes may be integrated in either a streaming video format, or saved as a video file. The present invention discloses a novel file layout, algorithm for encoding raw images into the format and algorithm for decoding the format back into the origin image. The format is designed for a fast parallel decoding and is implemented by a common multiprocessor such as a GPU. The format layout is designed for effectively exploits modern GPU architecture during decoding in order to get extremely high performance while maintaining high quality image.

The method compresses a raw input video frame where colors are represented in a luma/chroma-based color space. The input format is YUV420 with an alpha channel, where the luma plane (Y) and the alpha plane (A) are fully sampled and the chroma planes (U,V) are down sampled to quarter resolution.

The method compresses a raw frame into a video intra-frame, i.e., a keyframe. There is no additional data required for decoding a keyframe, as opposed to inter-frames that require previously decoded frames in order to completely decode an image.

The presented compression method is a lossy compression technique, based on methods for compressing images such as the Discrete Cosine Transform (DCT) and Huffman Coding.

Each plane is divided into small squared groups of samples called sub-blocks. The compression of each sub-block is performed using the following technique: first, a sub-block is transformed into the frequency domain with DCT; next, the DCT coefficients are quantized, resulting in a few non-zero DCT coefficients; finally, the quantized non-zero DCT coefficients are encoded using Huffman encoding.

The sub-blocks are arranged into two types of structures called full-color macro-blocks ("FC MBs") and half-color macro-blocks ("HC MBs"). Each FC macro-block holds four sub-blocks (one for each of Y, A, U and V) while each HC macro-block holds only luma and alpha (Y and A) sub-blocks.

The invention uses the same sub-block size for each channel although the input planes are not the same size.

The macro-blocks are arranged into a higher-level structure called a super macro-block ("SMB"). A super macro-block is a composition of a number of adjacent macro-blocks.

The format contains three main data structures:
1. Bit stream data—the compressed data for each super macro-block as described above.
2. Entry table—an array of pointers to the bit stream data where each entry points to a super macro-block location. The entry table is used for parallel direct access by GPU threads.
3. Huffman trees—sequence of serialized Huffman trees used for decoding Huffman-coded bit stream data. The Huffman tree structure can be stored either per frame or per sequence of frames.

The encoder performs the following operations:
1. Each plane is divided into a grid of small squared sub-blocks (as described herein), where each group has the same width and height.
2. Each sub-block is transformed into the frequency domain via the DCT transform.
3. Each sub-block frequency domain representation is quantized.
4. A Huffman code is calculated for each of the sub-block's non-zero coefficients.
5. The Huffman-coded coefficients are arranged in a specific order (discussed below) and written into the bit stream data structure while maintaining pointers to fill out the entry table.
6. The Huffman trees, entry table and bit stream data are written into the file.

The decoder performs a number of decoding sessions; each decoding session occurs per macro-block within a super macro-block. For example, in decoding session N, the Nth macro-block for all super macro-blocks is decoded.

The decoder performs the following operations in a decoding session for each macro-block and for each channel in a macro-block:
1. Read entry N in the entry table, where N is the number of the super macro-block containing the decoded macro-block.
2. Read the bit stream data at the position read in the previous step.
3. For each non-zero coefficient, parse the coefficient with the given Huffman tree.
4. Write the new bit stream position to the entry table.
5. De-quantize the DCT coefficients and transform the DCT coefficients back into the spatial domain with the IDCT transform.

All macro-blocks decoded in a decoding session can be parsed in parallel, that is, the algorithm described above can be processed in parallel for the first macro-block in all super macro-blocks. In the second session, the second macro-block in all super macro-blocks can be decoded in parallel.

Figure 2:
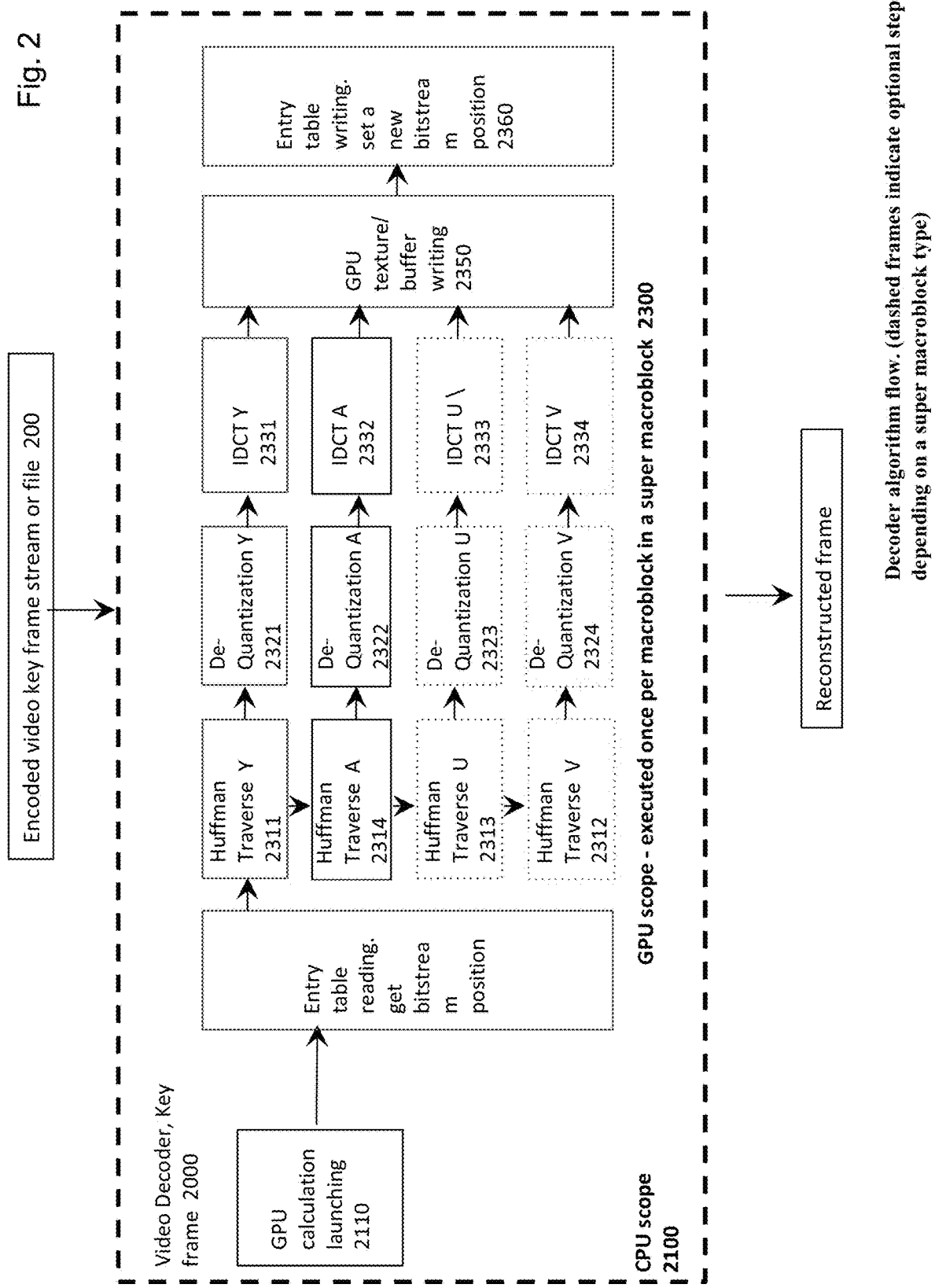
FIG. 2 presents a block diagram depicting the stages of video keyframe decoding according to an embodiment of the current invention.
Figure 3:
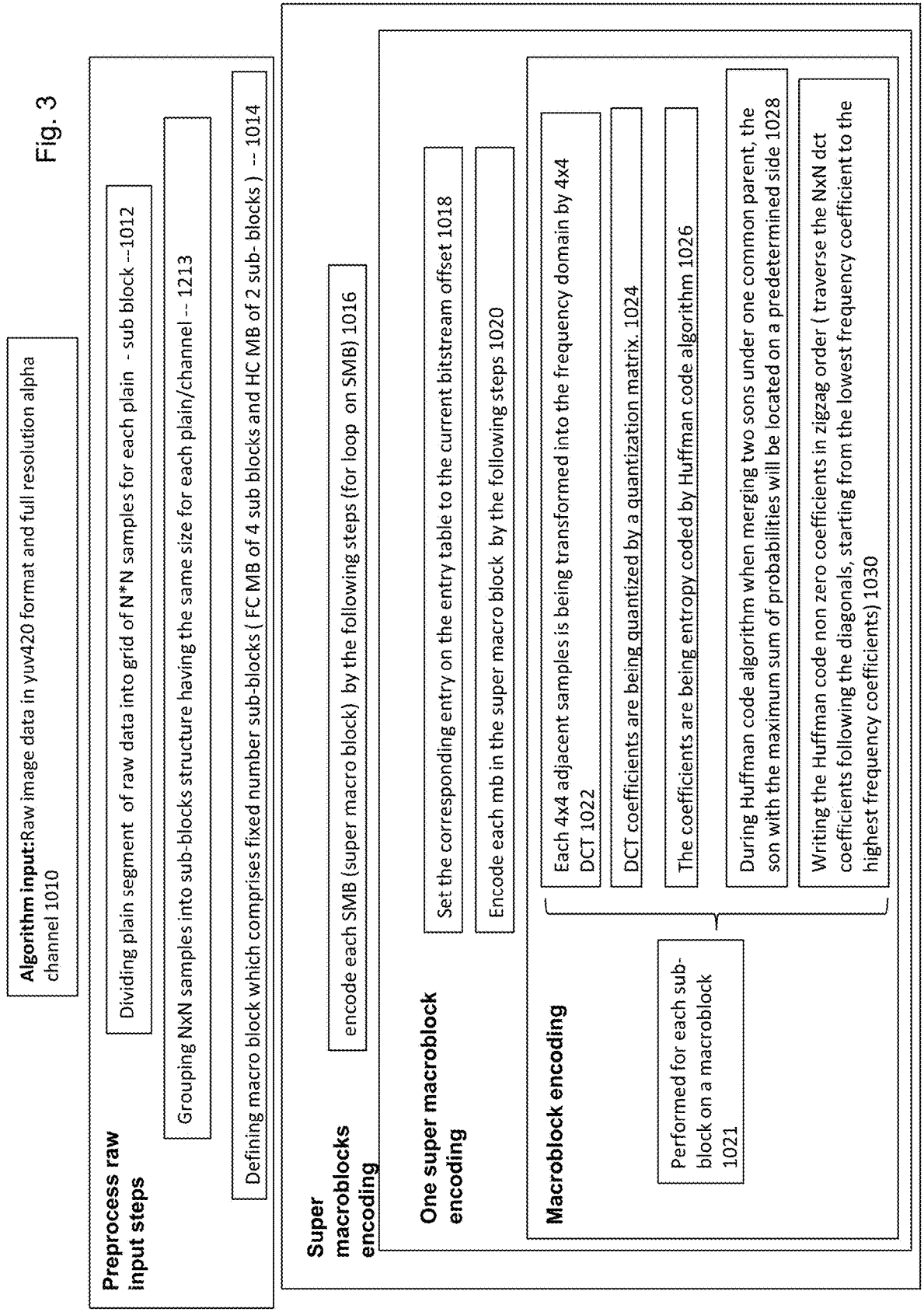
FIG. 3 presents a block diagram depicting the stages of video keyframe encoding according to an embodiment of the current invention.

FIG. 1 presents an overview block diagram depicting the stages of video keyframe encoding according to one embodiment of the current invention FIG. 2 presents an overview block diagram depicting the stages of video keyframe decoding according to one embodiment of the current invention FIG. 3 illustrates the encoding process, according to some embodiments of the present invention.

The encoder receives raw image data as an input (from input buffer YUVA 1050). The input image format is YUV420 with a additional full resolution alpha channel.

The encoder receives four integer quantization factors (1450). These factors determine quality and file size.

Each plane is divided into grid of N*N samples, constructing a sub-block (step 1012).

According to some embodiments of the disclosed method, a sub-block represents 4×4 adjacent samples. The sub-block size is determined in order to reduce macro-block decoding latency. Since macro-blocks are being decoded in parallel, reducing in latency have a great impact on macro-blocks decoding throughput and frame decoding time in total.

A full color macro-block (FC macro-block) is a composite of 4 sub-blocks, where each sub-block contains information from a different input plane (one for luma plane—Y, one for first chroma plane—U, one for second chroma channel V and one for opacity plane—A). FIG. 1: Y Sub-block Partition 1210, A Sub-block Partition 1220, U Sub-block Partition 1230 and Y Sub-block Partition V 1240

A half color macro-block (HC macro-block) is a composite of 2 sub-blocks, where one sub-block contains information from luma plane Y and the other from opacity plane A. "Macro-block" is a generalized name for an FC macro-block and HC macro-block.

The encoder groups N×N adjacent samples into sub-blocks structure (step 1014). All sub-blocks holds the same size regardless channel type. The encoder groups sub-blocks into a macro-block structure (step 1014).

The encoder arranges the macro-blocks into a higher-level structure called a super macro-block (SMB). A super macro-block is a composition of number of adjacent macro-blocks. (1016)

FIG. 5E illustrates a bit stream layout having focus of macro-block types order. FC macro-block types holding UV information require one quarter of the data, exactly like the ratio with respect to the input format (YUV 420).

Figure 6:
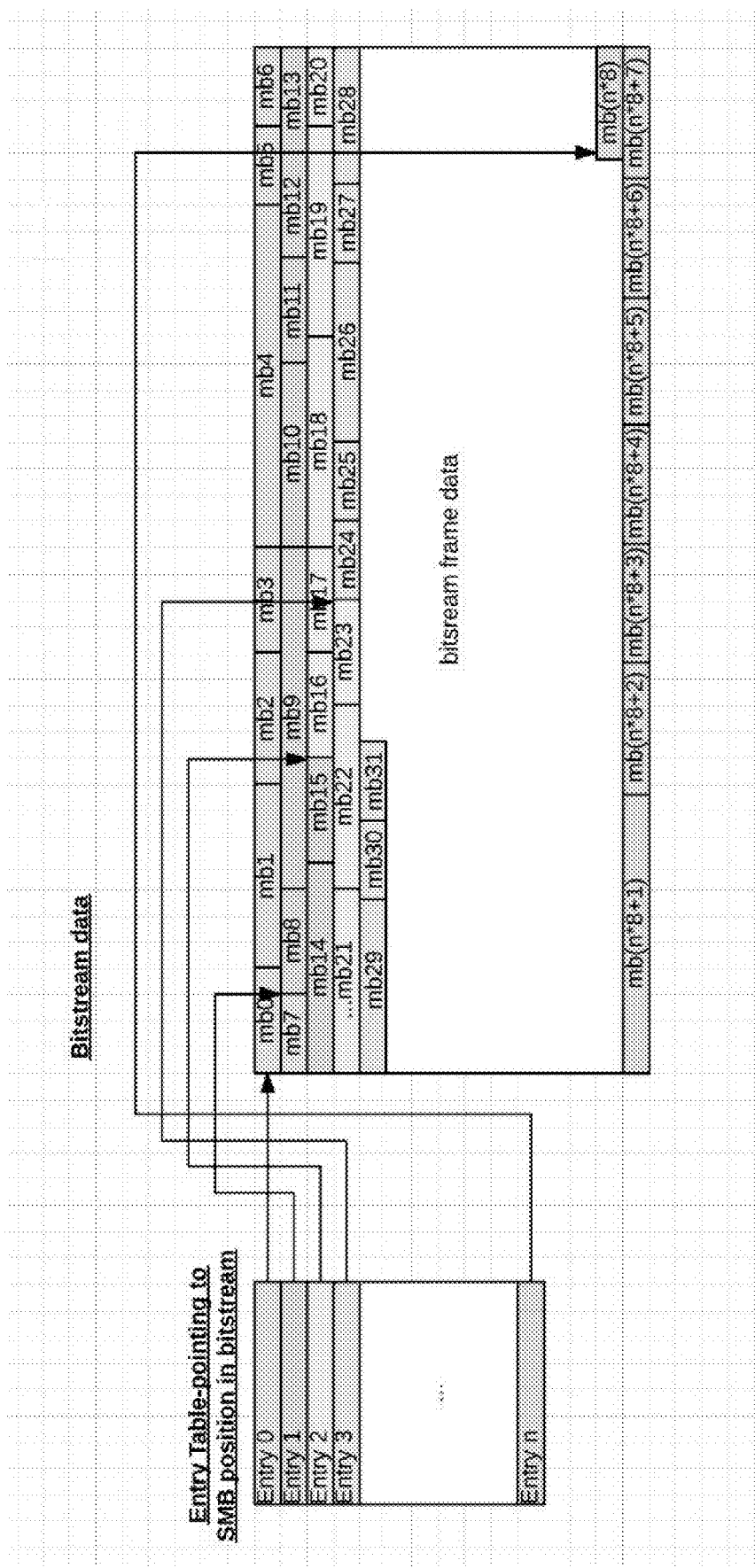
FIG. 6 presents the bit stream and entry table layout according to one embodiment of the current invention.
Figure 7A:
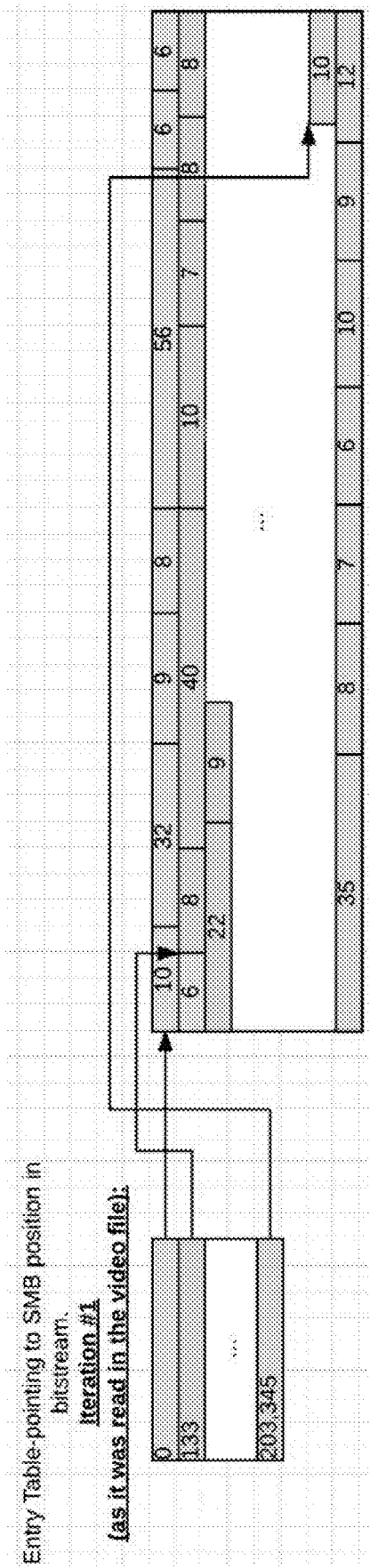
FIGS. 7A-7D illustrate dynamic updating of the entry table during decoding sessions according to some embodiments of the current invention.
Figure 7B:
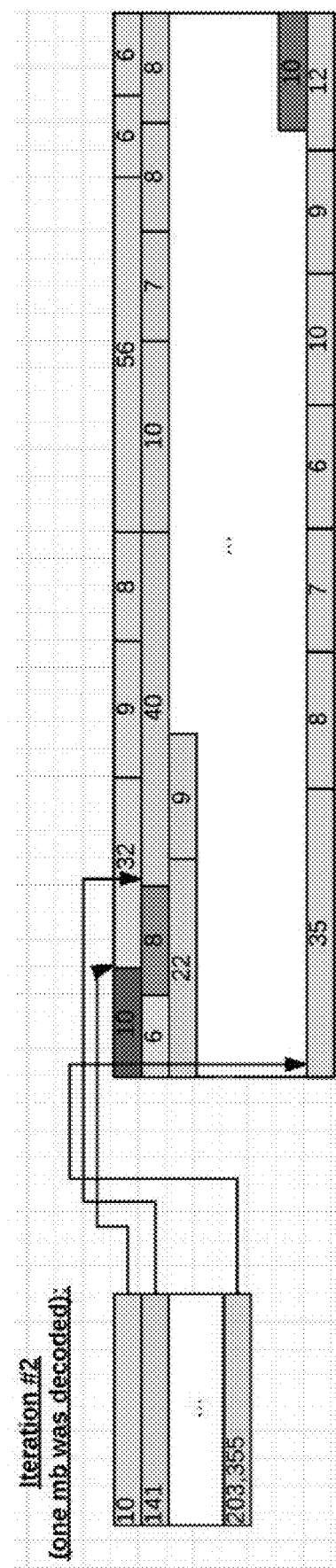
Figure 7C:
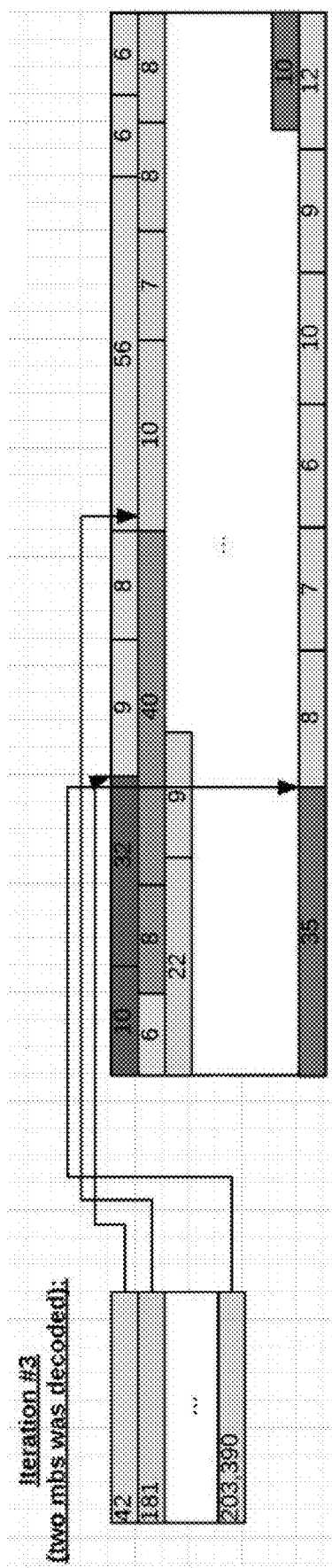
Figure 7D:
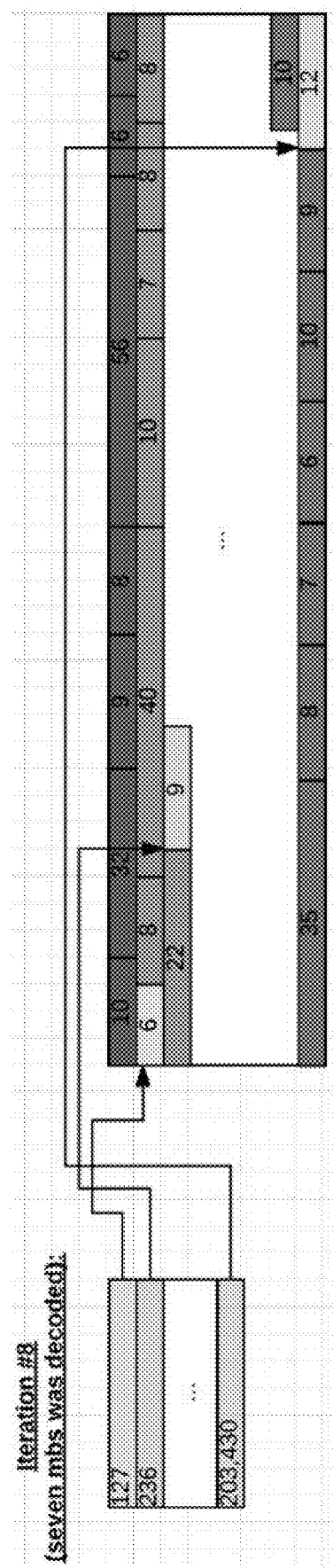

FIG. 6 illustrates a bit stream layout together with entry table. Each entry holds the pointer of the relevant SMB position on the bit stream data.

FIG. 7 illustrates entry table dynamic update during decoding session.

A new offset is written to the entry table on every decoding session, the output of the previous session is the input to the current session.

The encoder compresses each sub-block and writes them into the bit stream according to the macro-blocks and super macro-blocks order (see FIGS. 5, 6)

When the encoder finishes writing the compressed super macro-block in the bit stream, it updates the next entry of the entry table (see 2350 in FIG. 2) with the current bit stream position at a step 1018. This is indicated in FIG. 6 and results in encoded frame 200, as indicated in FIG. 2.

Sub-Block Encoding

The next steps are applied for each sub-block in a macro-block (step 1021):

Each 4×4 adjacent samples is being transformed into the frequency domain by 4×4 DCT (step 1022) (DCT 1310).

A small patch sampled from a monochrome natural image is usually smooth, and has a low frequency representation. Hence the DCT coefficients of 4×4 adjacent samples are normally characterized by having a number of close to zero or even zero coefficients.

The DCT coefficients are quantized by a quantization matrix 1410 (step 1024). The quantization is performed by element-wise dividing of the 4×4 coefficients in the quantization matrix. The element-wise division result is rounded to the closest integer value.

The quantization matrix is composed of a base quantization matrix multiplied by a scalar called quantization factor. The quantization factor is user-configurable per each Y,U,V,A component separately, and provides a level of flexibility in terms of image quality versus compressed data size (step 1025).

The quantization phase (i.e., the division of the DCT coefficients) usually zeros the coefficient of the high frequencies.

The coefficients are entropy coded by a Huffman code algorithm (as further discussed in detail below), and written into the bit stream in a zigzag ordering. The zigzag order traverses the N×N DCT coefficients following the diagonals, starting from the lowest frequency coefficient to the highest frequency coefficients (1028, 1030).

Ordering the DCT coefficients with zigzag order result in a sequence of coefficients equal to zero. This sequence of zeros is trimmed out and ignored during the next steps of the encoding process.

A null terminate value is added as the last DCT coefficients and is further encoded as any other coefficients, using entropy encoding (a lossless data compression). The null value indicates the end of a sub-block and that there are no more non-zero DCT coefficients to read.

The number of leading non zero coefficients may vary from one macro-block to another. However, at least one coefficient have to be written in order to transform the DCT signal back into the spatial domain.

The following paragraphs provide an example of the DCT processing. Let the following DCT coefficients matrix be the encoder output in step (1022):

$$200, 100, 30, 20$$
$$120, 30, 55, 1$$
$$50, 10, 5, 0$$
$$5, 1, 0, 0$$

Let 2 be the quantization factor and let the following matrix be the base quantization matrix spoken in steps (1024) and (1025).

$$4, 4, 8, 16$$
$$4, 8, 16, 16$$
$$8, 16, 16, 32$$
$$16, 16, 32, 64$$

The final quantization matrix becomes:

$$8, 8, 16, 32$$
$$8, 16, 32, 32$$
$$16, 32, 32, 64$$
$$32, 32, 64, 128$$

Element wise division of the original DCT coefficient matrix by the final quantization matrix, and consequent integer-casting yields the following quotient matrix:

$$25, 12, 2, 0$$
$$15, 2, 2, 0$$
$$3, 0, 0, 0$$
$$0, 0, 0, 0$$

The quantized DCT ordered by a zigzag ordering (1028, 1030) may be: 25,15,12,2,2,3,0,0,2,0,0,0,0,0,0,0.

The trailed sequence of zeros is trimmed out and a null terminate value is added to yield: 25,15,12,2,2,3,0,0,2, NULL.

Huffman Tree Structure

Figure 9A:
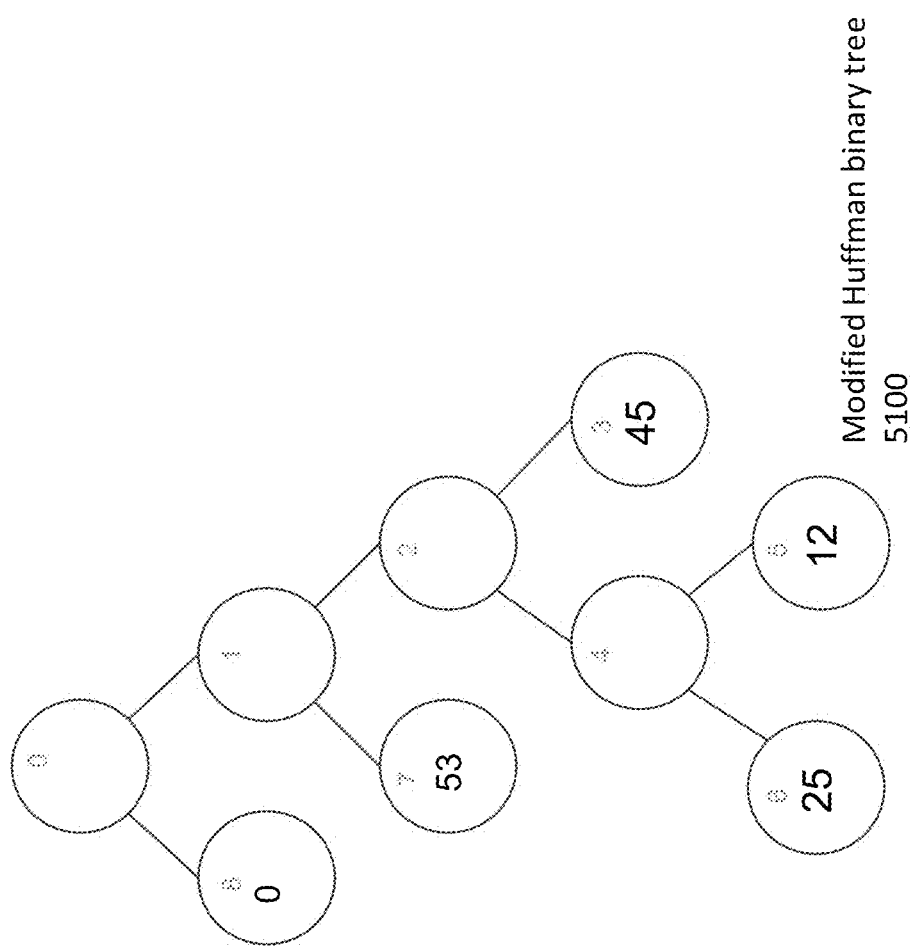

FIGS. 9A and 9B present an example of a Huffman entropy encoding binary tree, and a serialized data structure format representing that tree, as implemented in one embodiment of the present invention. FIG. 1 presents the Huffman encoding steps by channels: Y 1510, A 1520, U 1530, V 1540.

Entropy encoding according to the Huffman binary tree structure involves replacing words in a bit stream into prefix codes with variable bits sizes. Each word is replaced by a prefix code based on the number of occurrences of the word in the stream. As much as the word occurs more frequently the word is replaced with a shorter word in the prefix code.

The present invention makes use of a novel data structure to represent the Huffman binary tree, so as to optimize the utilization of the GPU cache and minimize the number of data memory fetch cycles during the decoding process.

The structure of a Huffman tree is an array, in which each cell represents a node (internal node or leaf). The array cells are ordered by a pre-order Huffman tree traversal of parent node, right child node and the left child node.

Each cell holds two field values. The first is an indication of a leaf/internal node. The second field is a data field having functionality depending on the first field indication. When a node holds an indication of a leaf, the data field is the original encoded value. When a node is an internal node, the field is an offset to the left child node.

According to the Huffman tree construction algorithm, a node can have a zero value or two child nodes, that is, there is no option of a node with only one child node. The right child node of an internal node is always located on the right following cell.

During the encoding process, when merging two child nodes under one common parent, the child node with the maximum sum of probabilities (the larger probability) is located on a predetermined side. For example, it may be set as the right side. The original Huffman algorithm does not specify the position of the two merged nodes; inconsistent choice of sides does not affect the Huffman algorithm.

Based on the Huffman binary tree data structure, the decoding process traverses the array in the following manner:
1. The decoder sets the current cell to the root node (most left cell).
2. The decoder checks the current cell leaf indication.
3. If the leaf indication is false: The decoder reads a bit from the bit stream.
4. If the bit value equal to 1: The decoder traverses to the right child node, located one cell right to the inner node.
5. The decoder sets the current cell to the right child node.
6. If the bit value equal to 0: The decoder traverses to the left child node by shifting to the position written in the current node.
7. The decoder sets the current cell to the left child node.
8. Return to step 2.
9. If the leaf indication is true: The decoder returns the current cell value as the decoded value.

According to the process described above, when decoding an inner node, in most cases, the decoder shifts the right cell. That is a result of positioning the right child node as the node with a larger probability on the right cell of the inner node. This method optimizes memory access and cache utilization during decoding process.

Decoding Process

Figure 4:
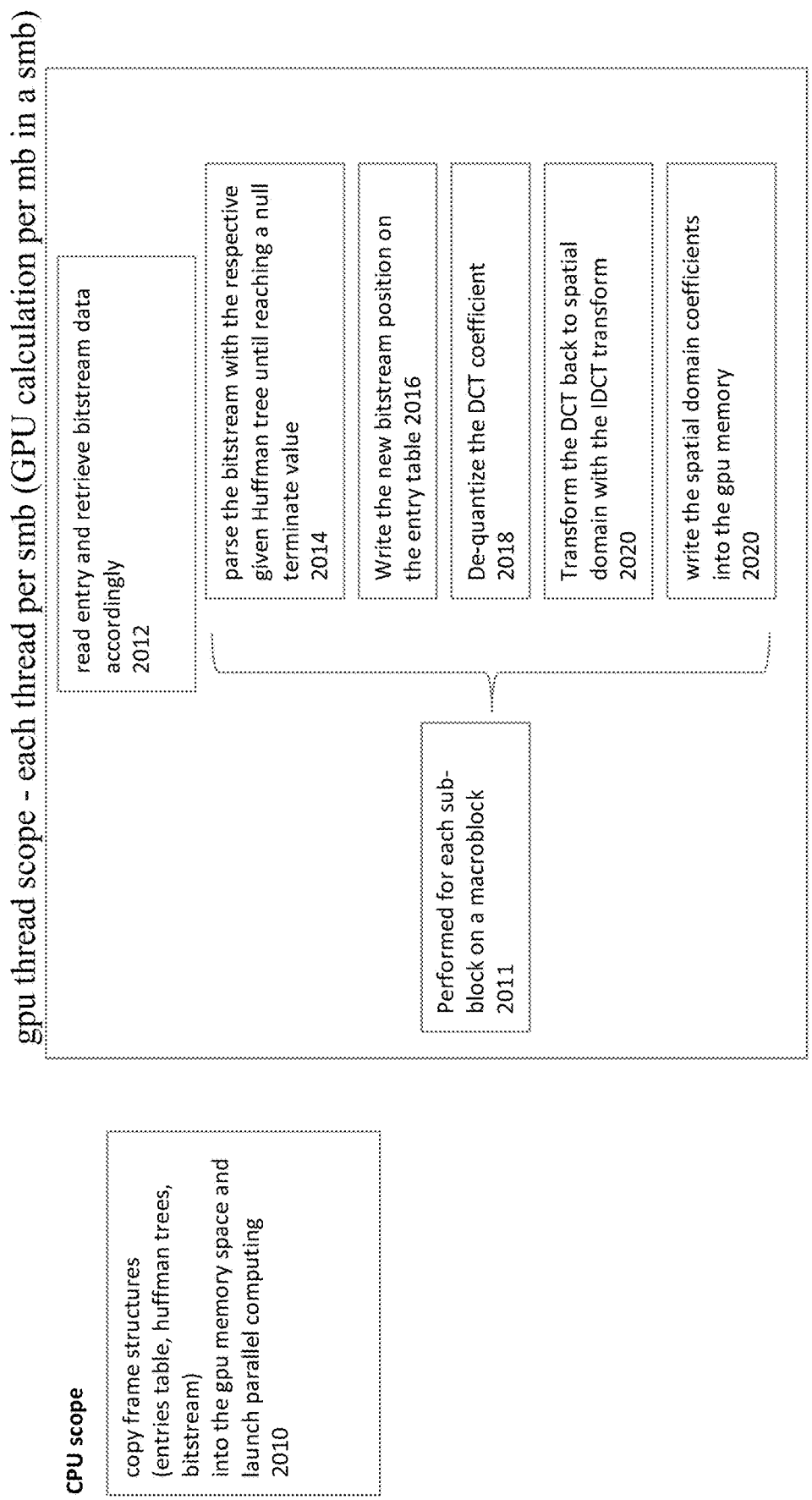
FIG. 4 presents a block diagram depicting the stages of video keyframe decoding according to an embodiment of the current invention.

FIG. 4 disclose the process of decoding the compressed data:

At the first stage, the frame structures (entries table, Huffman trees, bit stream) are copied into GPU memory space and parallel computing is activated (step 2010). The GPU calculation is launched at a step 2110, also indicated in FIG. 1.

The decoding is performed by parallel processing using a GPU. Each thread is applied per sub-block on a super macro-block (step 2012)

The decoding process includes a number of iterations. At each iteration the corresponding macro-blocks on all super macro-block are decoded in parallel by the GPU. That is, in a decoding session number N the Nth macro-block in all super macro-block are decoded. As a result, the number of decoding iteration is the number of macro-blocks in a super macro-block.

In each decoding iteration, the frame data (Entry table, Huffman trees, bit stream data) are passed into the GPU and a GPU parallel decoding starts. Entry table reading get bit stream position at a step 2360, as indicated in FIG. 2.

In each iteration the decoder decodes all the planes in a macro-block (four for FC macro-block or two for HC macro-block).

The decoder performs the following operations in each decoding iteration:
1. Let N be the number of the current super macro-block.
2. For each sub block (channel) in a macro-block:
3. Read entry number N in the entry table (step 2012)
4. Parse the bit stream with Huffman algorithm (as described above) starting from the position read in the previous step until reached to a null terminate value. (step 2014) (see Huffman Traverse Y, 2311, Huffman Traverse A, 2312, Huffman Traverse U, 2313, Huffman Traverse V, 2314) Write the new bit stream position on entry number N in the entry table. (step 2016)
5. Dequantize the DCT coefficients (Step 2018), as indicated in FIG. 2: De-Quantization Y 2321, De-Quantization A 2322, De-Quantization U 2323, De-Quantization V Y2324).
6. Transform the DCT coefficients back into Spatial domain with IDCT transform (step 2020) (see FIG. 2: IDCT Y 2331, IDCT A 2331, IDCT U 2333, IDCT V 2334).
7. Write the Spatial domain coefficients into a the GPU memory (step 2020). (FIG. 2 GPU texture/buffer writing 2350)
8. Based on the Spatial domain coefficients, the Entry table writing set a new bit stream position (FIG. 2 2360), resulting reconstructed frame 2370.

All macro-block which have being decoded in a decoded session can be parsed in parallel. That is, the algorithm described above can be processed in parallel for all macro-blocks in all super macro-blocks, for each decoding session.

Figure 8:
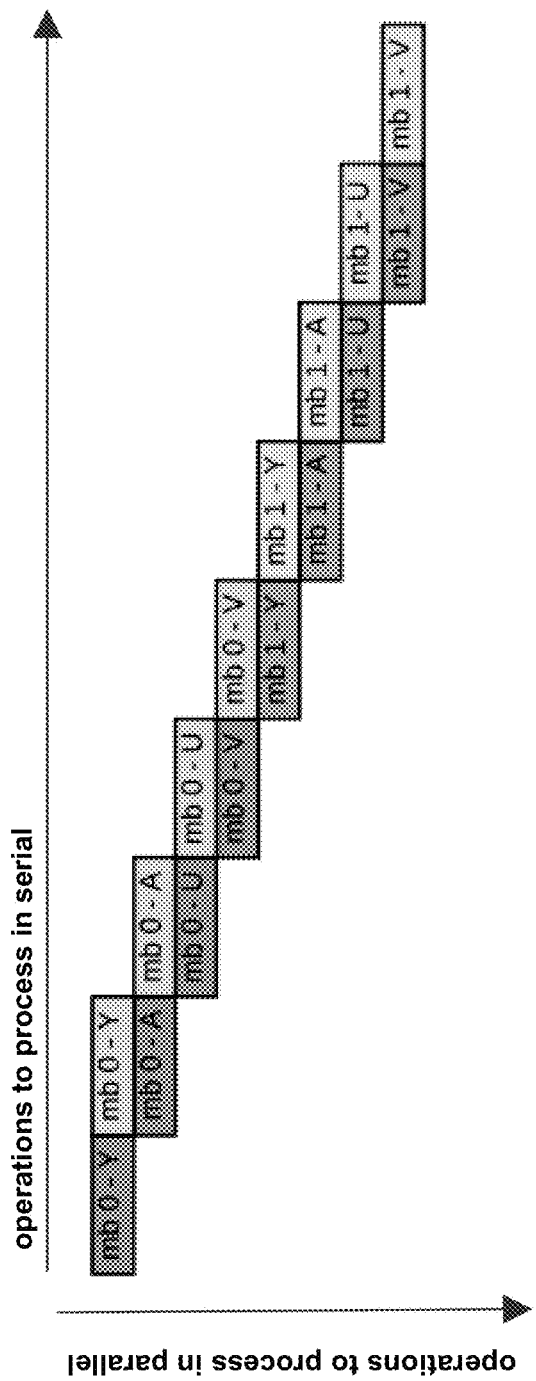
FIG. 8 illustrates the level of parallelism that can be achieved while decoding macro-block and between decoding sessions.

Parsing each sub-block (channel) may also be partially processed in parallel by launching the next sub-block (channel) decoding exactly after step 2016 is done (as described with respect to FIG. 8).

According to some embodiments of the present invention, decoding iteration can also be partially in parallel by launching the next decoding iteration exactly after step 2016 is done for the last plane (as described in [2] and in FIG. 8).

The DCT/IDCT transform is a separable transformation and its implementation on a GPU achieves a good instruction level parallelism.

SMB/Macro-Block Skip Optimization

According to some embodiments of the present invention, a few optimizations can be done on the file size when the encoded data is repetitive.

If a set of SMB data is identical with another SMB data set, the encoder writes the data on the bit stream only once and the entry table points to the same data twice or more.

In case of two sequential identical macro-blocks that positioned on the same super macro-block, the encoder writes the data of the first macro-block and replaced the second macro-block completely with only one null terminate value. This is enough to indicates a "skipped" macro-block since a non skipped macro-block need to holds at least one non zero coefficient. Since macro-blocks that lay on the same SMB are being decoded in serial—the already decoded image patch/already decoded DCT coefficients can be read directly.

The invention claimed is:

1. A method for encoding bit stream image data organized into sub blocks, said method implemented by one or more processors operatively coupled to a non-transitory computer readable storage device, on which are stored modules of instruction code that when executed cause the one or more processors to perform:
    transforming each sub block into a frequency domain DCT matrix;
    coding coefficients of the DCT matrix by a Huffman tree algorithm which is represented by an array that holds two fields, the first for data, the second an indication of whether a node is an end-leaf, wherein the data field represents the actual leaf value on a leaf node, and an offset to a child node with the smaller probability on an inner node, and wherein the array entries are ordered such that a child node with the larger probability is located adjacent to the parent node, and the child node with the smaller probability is pointed by the parent node on the data field.

2. The method of claim 1, wherein the sub blocks are defined by dividing plane segment of raw data into grid of N*N samples for each plane.

3. The method of claim 1, wherein the sub blocks are organized by grouping and compressing N×N adjacent samples into a sub-blocks structure where all sub-blocks are compressed to the same size of data regardless channel type.

4. The method of claim 1 further comprising the step of defining macro-block which comprises fixed number of sub-blocks.

5. The method of claim 1 wherein macro-blocks are organized by super macro-block by setting the corresponding entry on the entry table to the current bit stream offset of each super macro-block and encoding each macro-block in the super macro-block structure.

6. The method of claim 5 further comprising further steps for decoding comprising:
    copying an entry table, Huffman trees, and bit stream data into the GPU memory space and activating parallel computing;
    launching a multiprocessing thread by the decoder on at least one super macro-block;
    reading an entry from the entry table and retrieving the bit stream data, and, for each sub-block, parse the bit stream with the respective given Huffman tree until reaching a null terminate value; write the new bit stream position to the entry table; re-quantize the DCT coefficient; and transform the DCT back to a spatial domain with the IDCT transform.

7. The method of claim 1 wherein multiple decoding iteration is partially performed in parallel by launching the next decoding iteration immediately after writing a new bit stream position to entry number N in the entry table for the last plane.

8. The method of claim 1 wherein encoding the said Huffman tree comprises performing a pre-order traversal, where the first child node to iterate is the child node with the higher probability.

9. The method of claim 5 wherein the said bit stream size is optimized by storing identical super macro-block once and using the entry table to points to the same data from different entries.

10. The method of claim 5 wherein the said bit stream size is optimized in case a number of sequential identical macro-blocks are positioned on the same super macro-block, where the optimization is achieved by the following steps:
    the encoder writes the data of the first macro-block only;
    the encoder replaces the following identical macro-block completely with only one null terminate value.

11. An encoder implemented on at least one processing unit for encoding bit stream image data organized in sub blocks, said system comprising a non-transitory storage device and one or more processing devices operatively coupled to the storage device on which are stored modules of instruction code that when executed cause the one or more; processors to perform:
    transforming each sub block data into frequency domain DCT matrix;
    coding coefficients of the DCT matrix by a Huffman tree algorithm which is represented by an array that holds two fields, the first for data, the second an indication of whether a node is an end-leaf;
    wherein the data field represents the actual leaf value on a leaf node, and an offset to a child node with the smaller probability on an inner node; and
    wherein the array entries are ordered such that:
        a child node with the larger probability is located adjacent to the parent node; and
        the child node with the smaller probability is pointed by the parent node on the data field.

12. The system of claim 11, wherein the sub blocks are defined by dividing each segment of raw data into a grid of N*N samples for each plane.

13. The system of claim 11, wherein the sub blocks are organized by Grouping and compressing N×N adjacent grid samples into sub-blocks structure where all sub-blocks compresses the same size of data regardless channel type having the same size for each plane.

14. The system of claim 11 further comprising the step of defining macro-block which comprises fixed number of sub-blocks.

15. The system of claim 11 wherein macro-blocks are organized by super macro-block by setting the corresponding entry on the entry table to the current bit stream offset of each super macro-block and encode each macro-block in the super macro-block structure.

16. The system of claim 11 further comprising multi processing units and a decoder applying the following steps:
    copying entries table, Huffman trees and bit stream into the GPU memory space and activating parallel computing;
    launching multiprocessing thread launched by the decoder on at least one super macro-block;
    reading entry from entry table and retrieve bit stream data and for each sub block perform:
    parse the bit stream with the respective given Huffman tree until reaching a null terminate value;
    write the new bit stream position on the entry table;
    de-quantize the DCT coefficient;
    transform the DCT back to spatial time domain with the IDCT transform.

17. The method of claim 1 wherein multiple decoding iteration is partially performed in parallel by launching the next decoding iteration immediately after writing the new bit stream position on entry number N in the entry table for the last plane.

18. A method of claim 1 wherein for encoding the said Huffman tree are performed a pre order like traversal, where the first child to iterate on, is the child with the higher probability.

19. The method of claim 5 wherein the said bit stream size is optimized by storing identical super macro-block once and using the entry table to points to the same data from different entries.

20. The method of claim 5 wherein the said bit stream size is optimized in case a number of sequential identical macro-blocks are positioned on the same super macro-block, where the optimization is achieved by the following steps:
   the encoder writes the data of the first macro-block only;
   the encoder replaces the following identical macro-block completely with only one null terminate value.

21. The method of claim 10 wherein in case a super macroblock is completely identical to the next super macroblock the bitstream for the following super macroblock don't contain any macroblock, and the next entry is set on the entry table to point the previous super macroblock in the bit stream.

* * * * *